(12) United States Patent
Remaker

(10) Patent No.: US 10,373,086 B2
(45) Date of Patent: Aug. 6, 2019

(54) CONTROLLING RESOURCE MANAGEMENT IN A WORKSPACE

(71) Applicant: Cisco Technology, Inc., San Jose, CA (US)

(72) Inventor: Phillip Remaker, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 410 days.

(21) Appl. No.: 15/065,132

(22) Filed: Mar. 9, 2016

(65) Prior Publication Data
US 2017/0262779 A1    Sep. 14, 2017

(51) Int. Cl.
| G06Q 10/06 | (2012.01) |
| H04L 29/08 | (2006.01) |
| H04L 12/26 | (2006.01) |
| H04L 12/24 | (2006.01) |

(52) U.S. Cl.
CPC ........ *G06Q 10/06313* (2013.01); *G06Q 10/063114* (2013.01); *H04L 41/0677* (2013.01); *H04L 43/08* (2013.01); *H04L 43/0811* (2013.01); *H04L 67/22* (2013.01)

(58) Field of Classification Search
None
See application file for complete search history.

(56) References Cited

U.S. PATENT DOCUMENTS

| 4,905,151 | A | 2/1990 | Weiman et al. |
| 5,111,401 | A | 5/1992 | Everett, Jr. et al. |
| 2009/0089092 | A1* | 4/2009 | Johnson ............... G06Q 10/06 705/2 |
| 2013/0103552 | A1* | 4/2013 | Hoffman ............... G06Q 10/00 705/28 |
| 2014/0063061 | A1 | 3/2014 | Reitan |
| 2014/0303773 | A1* | 10/2014 | Wurman .................. B65F 3/00 700/228 |
| 2015/0039357 | A1* | 2/2015 | Segal ............... G06Q 10/06314 705/5 |

OTHER PUBLICATIONS

IRobot (iRobot Launches AVA(TM) 500 Video Collaboration Robot with Cisco TelePresence, Business Wire, ProQuest, Jun. 10, 2013).*

(Continued)

*Primary Examiner* — Johnna R Loftis
*Assistant Examiner* — Matthew D Henry
(74) *Attorney, Agent, or Firm* — Edell, Shapiro & Finnan, LLC

(57) ABSTRACT

Controlling resource management in a workspace includes, at a controller having connectivity to a network, monitoring one or more physical resources in a physical workspace having a plurality of work stations. An identity of one or more users present in or scheduled to be present in the physical workspace is determined. Status information is determined for each of the one or more physical resources in the physical workspace. Deployment of a particular resource of the one or more physical resources to a particular work station among the plurality of workstations is controlled based on the status information and the identity of the particular user.

20 Claims, 10 Drawing Sheets

(56) References Cited

OTHER PUBLICATIONS

Zollinger, "AS/RS Application, Benefits and Justification in Comparison to Other Storage Methods: A White Paper," 2001, retrieved from http://www.mhi.org/downloads/industrygroups/as-rs/technicalpapers/asrswhitepaper2.pdf, on Mar. 9, 2016, 24 pages.

Bell & Howell, "Mailmobile 4, The Newest Generation," © 2002, brochure retrieved from http://www.egeminusa.com/pdf/Egemin_Mailmobile4.pdf, on Mar. 9, 2016, 2 pages.

Aethon, "TUG: Smart Autonomous Mobile Robot," Brochure, Oct. 2013, 6 pages.

Irobot, "Roomba, Vacuum Clean Robot, 790.04," Sell Sheet, © 2011, retrieved from https://cdn.shopify.com/s/files/1/0059/3932/files/IRO_010_SellSheets_790_04.pdf, on Mar. 9, 2016, 2 pages.

Irobot, "Ava, Mobile Robotics Plattorm," Brochure, May 2011, 4 pages.

Google, "Google Self-Driving Car Project Monthly Report," May 2015, 5 pages.

HK Systems, "Robotic Document Handling, Automated Library Storage System," Brochure, Feb. 2007, 2 pages.

Irobot, "Robot Ava 500 Video Collaboration Robot," Brochure, 2004, retrieved from http://www.irobot.com/~/media/Files/Robots/Commercial%20Applications/Ava%20500/Ava500_Applications_Brochure.pdf, on Mar. 9, 2016, 8 pages.

Williams, "Autonomous filing cabinet reminds us that information lasts in the digital age," Jun. 30, 2014, retrieved from http://www.gizmag.com/autonomous-filing-cabinet-information-digital-age/32754/, on Feb. 18, 2016, 4 pages.

Tam, "Meet Amazon's busiest employee—the Kiva robot," Nov. 30, 2014, retrieved from http://www.cnet.com/news/meet-amazons-busiest-employee-the-kiva-robot/, on Feb. 18, 2016, 6 pages.

Cisco, "Cisco Smart+ Connected Meeting Spaces: A New Paradigm in Reserving, Locating and Experiencing Meetings," At-A-Glance, Oct. 2015, 3 pages.

\* cited by examiner

400

| LOCATION | RESOURCE | USER |
|----------|----------|------|
| DESK 1 | RESOURCE 1 | NULL |
| DESK 2 | RESOURCE 2 | NULL |
| ⋮ | ⋮ | ⋮ |
| DESK N | RESOURCE 3 | NULL |
| STORAGE 1 | RESOURCE 4 | NULL |
| STORAGE 2 | RESOURCE 5 | NULL |
| ⋮ | ⋮ | ⋮ |
| STORAGE N | RESOURCE X | NULL |

| LOCATION | RESOURCE | USER |
|---|---|---|
| DESK 1 | RESOURCE 5 | USER 1 |
| DESK 2 | RESOURCE 2 | NULL |
| ⋮ | ⋮ | ⋮ |
| DESK N | RESOURCE 3 | NULL |
| STORAGE 1 | RESOURCE 4 | NULL |
| STORAGE 2 | RESOURCE 1 | NULL |
| ⋮ | ⋮ | ⋮ |
| STORAGE N | RESOURCE X | NULL |

| LOCATION | RESOURCE | RESOURCE DATA | USER |
|---|---|---|---|
| DESK 1 | RESOURCE 5<br>RESOURCE X | USE BY OWNER; FULL BATTERY<br>ON-DEMAND USE; LOW BATTERY | USER 1 |
| DESK 2 | RESOURCE 2 | IDLE; FULL BATTERY | NULL |
| ⋮ | ⋮ | ⋮ | ⋮ |
| DESK N | RESOURCE 3 | IDLE; FULL BATTERY | NULL |
| STORAGE 1 | RESOURCE 4 | IDLE; FULL BATTERY | NULL |
| STORAGE 2 | RESOURCE 1 | IDLE; CHARGE COMPLETE; ERROR DETECTED | NULL |
| ⋮ | ⋮ | ⋮ | ⋮ |
| STORAGE N | NULL | NULL | NULL |

| LOCATION | RESOURCE | RESOURCE DATA | USER |
|---|---|---|---|
| DESK 1 | RESOURCE 5 | IDLE; FULL BATTERY | NULL |
| DESK 2 | RESOURCE 2 | IDLE; FULL BATTERY | NULL |
| ⋮ | ⋮ | ⋮ | ⋮ |
| DESK N | RESOURCE 3 | IDLE; FULL BATTERY | NULL |
| STORAGE 1 | RESOURCE 1 | IDLE; FULL BATTERY; ERROR ASSEMENT | NULL |
| STORAGE 2 | RESOURCE X | IDLE; CHARGING | NULL |
| ⋮ | ⋮ | ⋮ | ⋮ |
| STORAGE N | RESOURCE 4 | IDLE; FULL BATTERY | NULL |

FIG.10

CONTROLLING RESOURCE MANAGEMENT IN A WORKSPACE

TECHNICAL FIELD

The present disclosure relates to automated workspace systems.

BACKGROUND

As organizations expand geographically, workforces are becoming increasingly distributed. In this distributed landscape, many employees work remotely from an enterprise's office space on a regular basis and/or during travel. Consequently, enterprises/organizations are now utilizing collaboration systems to allow their employees to work together, regardless of their physical locations. However, when employees from an organization are dispersed in various locations, it may not be efficient or possible for an organization to provide permanent physical workspaces with the requisite technical infrastructure (e.g., for collaboration) for every employee. Consequently, some organizations are now utilizing "hoteled" or shared workspaces, which are physical office spaces (e.g., work stations) that are shared by multiple users in the same manner as hotel rooms.

BRIEF DESCRIPTION OF THE DRAWINGS

FIG. 4 is a diagram depicting a database table tracking the deployment of FIG. 2, according to an example embodiment.

FIG. 6 is a diagram depicting an updated database table tracking the deployment of FIG. 5, according to an example embodiment.

FIG. 8 is a diagram depicting an updated database table tracking the deployment of FIG. 7, according to an example embodiment.

FIG. 10 is a diagram depicting an updated database table tracking the deployment of FIG. 9, according to an example embodiment.

DESCRIPTION OF EXAMPLE EMBODIMENTS

Overview

Figure 1:
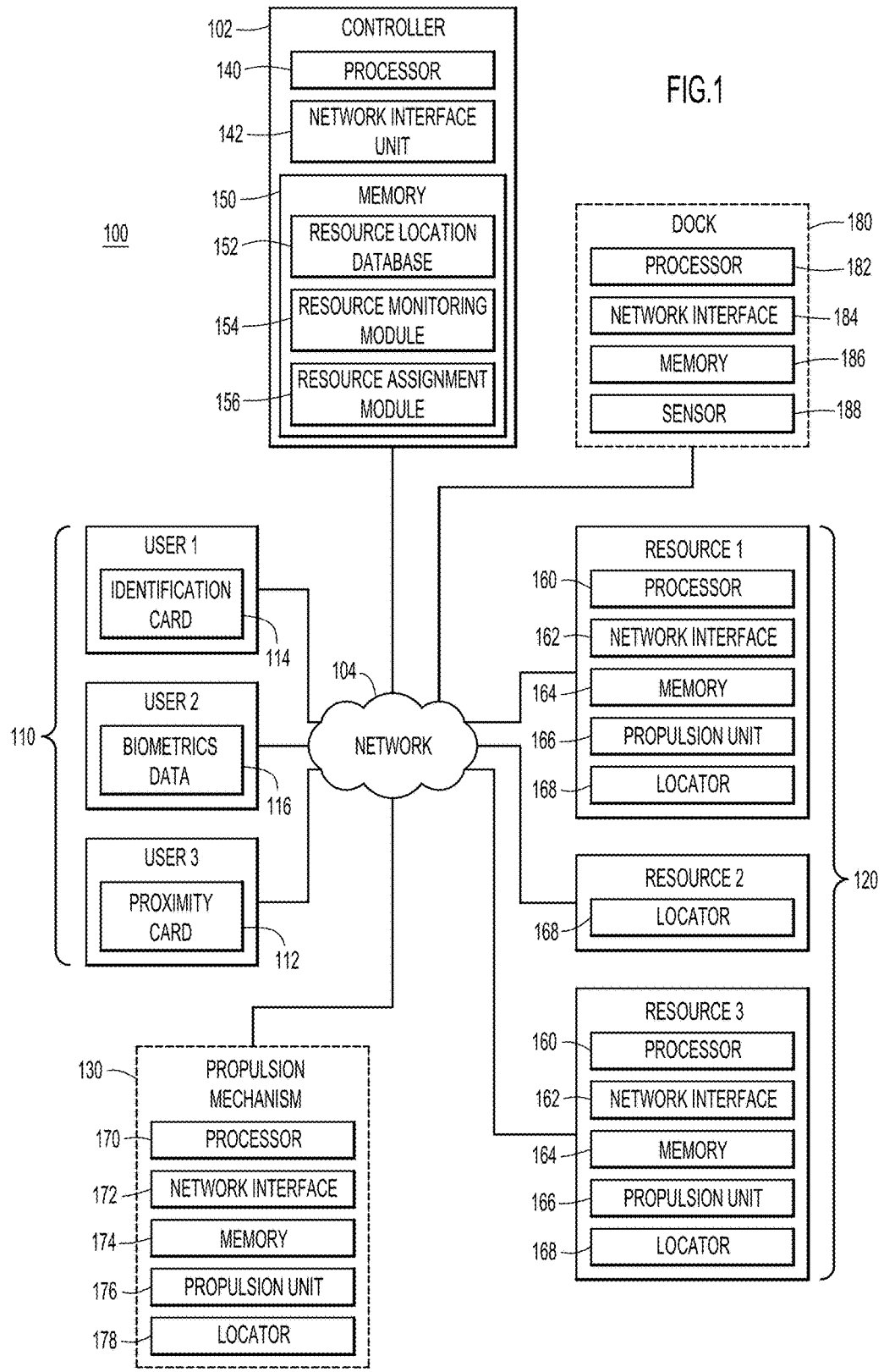
FIG. 1 is a block diagram of an environment in which resource management is controlled, according to an example embodiment.

Techniques are provided herein for controlling resource management in a collaborative/shared workspace. These techniques may be embodied as a method, a system, an apparatus, and instructions in a computer-readable storage media to perform the method.

According to at least one example embodiment, controlling resource management in a workspace includes, at a controller having connectivity to a network, monitoring one or more physical resources in a physical workspace having a plurality of work stations. An identity of one or more users present in or scheduled to be present in the physical workspace is determined. Status information is determined for each of the one or more physical resources in the physical workspace. Deployment of a particular resource of the one or more physical resources to a particular work station among the plurality of workstations is controlled based on the status information and the identity of the particular user.

According to at least one other example embodiment, a system for controlling resource management in a workspace includes one or more autonomous physical resources and a controller configured to deploy the autonomous physical resources in a physical workspace having a plurality of work stations. In order to deploy the autonomous physical resources, the controller may include a processor configured to monitor the autonomous physical resources in the physical workspace. An identity of one or more users present in or scheduled to be present in the physical workspace is determined. Status information is determined for each of the one or more autonomous physical resources in the physical workspace. Deployment of a particular autonomous physical resource of the one or more autonomous physical resources to a particular work station, among the plurality of workstations, associated with a particular user of the one or more users is controlled based on the status information and the identity of the particular user.

Example Embodiments

Presented herein are techniques for controlling resource management in a workspace. Generally, the techniques control physical resources in a shared or collaborative workspace by controlling propulsion of the physical resources to automatically locate the physical resources to an appropriate work station within the shared workspace, such as an office space being used by a user/renter/employee associated with the physical resource. In some embodiments, the physical resources include propulsion units and, thus, are self-propelled physical resources. However, in other embodiments, the physical resources may be automatically propelled by a propulsion mechanism, such as an unmanned aerial vehicle (UAV) or other type of drone, in order to be auto-located to an appropriate work station within the workspace.

Regardless, when a user checks in to a specific work station, any physical resources associated with the renter may automatically arrive at the user's specific work station. Additionally or alternatively, if a user needs a pooled resource, such as collaboration equipment (e.g., a camera, video display, projector, and/or telepresence unit), a shared file cabinet (insofar as the term cabinet denotes any file cabinet, closet, bin, drawer, or other storage device) or any other shared physical resource, the pooled resource may be automatically delivered to the user upon request. Moreover, in at least some embodiments, the techniques provided herein may provide safety, geolocation, occupancy, and management systems for the physical resources.

Typically, in shared workspaces, a user (e.g., a customer and/or employee) may select a specific work station prior to or upon arriving at the workspace. Alternatively, a user may be assigned a specific work station upon arriving to the workspace. Regardless, once a user arrives at his or her specific work station within the shared workspace, basic resources in the work station (e.g., a desk, phone, computer, and lighting), especially Internet connected resources, may be configured for the user, either manually or via the Internet of Things (IoT). For example, the lighting in the specific work station may be activated, the height of the desk in the specific work station may be adjusted, and/or a phone unit provided in the specific work station may be registered in a personalized manner.

However, typically in shared workspaces, additional physical office resources, such as filing cabinets, whiteboards, collaboration equipment, printing equipment, etc., must also be supplied to users. Some of these resources are shared resources that are available to any user currently using a work station. Other resources, such as file cabinets or portions of a file cabinet, may be private resources that are only available to a specific user. However, in order to be profitable and/or more efficient, shared workspaces generally need to be oversubscribed. Thus, there are more users (e.g., renters, employees, etc.) than work stations (e.g., offices, desk areas, etc.). Consequently, shared workspaces need to provide storage separate from the work stations included therein, where idle resources can be stored. Then, if a user wants to use a resource, the user will need to retrieve these physical office resources from storage and/or visit an area where physical resources are clustered, while also moving any inappropriate resources out of their work station and into the clustered area. Consequently, the idle resources need to be stored in an accessible manner so that users can retrieve or access any needed resources at any time (e.g., use a drawer of a filing cabinet). Providing resources in this manner frequently requires large areas of a shared workspace to be dedicated to storage. Moreover, as a workspace becomes increasingly oversubscribed (and, thus, increasingly profitable), more resources will be present in the workspace, thereby requiring larger areas to be devoted to storage, which are harder to manage, more expensive, and more difficult for a user to navigate when attempting to locate a needed physical resource.

Reference is first made to FIG. 1, which illustrates an environment 100 for controlling resource management in a shared workspace. In the network environment 100, the controller 102 sits between at least one resource and one or more users. The controller 102 communicates with the resources and users via a network 104. For example, in the depicted embodiment, the controller 102 is between a group of resources 120 (including Resource 1, Resource 2, and Resource 3) and a group of users 110 (including User 1, User 2, and User 3), and communicates with the users 110 and the resources 120 via network 104. Additionally, in some embodiments, the controller may communicate, via the network 104, with at least one propulsion mechanism, such as propulsion mechanism 130, and/or at least one dock or docking station, such as dock 180. For simplicity, FIG. 1 illustrates the group of users 110 as including three users (Users 1, User 2, and User 3) and the group of resources as including three resources (Resource 1, Resource 2, and Resource 3). However, in other embodiments, the group of users 110 and the group of resources 120 may include any number of users or resources.

The controller 102 may communicate with the users 110, resources 120, propulsion mechanism 130, and/or dock 180 via any processes, protocols, functions now known or hereinafter developed. For example, in some embodiments, the controller 102 may detect the presence of a user within a shared workspace by communicating with a proximity card 112 (either active or passive), an identification card 114, a radio device, an electronic key fob, or any other access or identification device carried by a user (e.g., a renter), as is described in more detail below in connection with FIG. 2. As another example, the controller 102 could communicate with a user's smart phone or computing device to detect the presence of a user and identify the user. Additionally or alternatively, the controller 102 may detect the presence of a user with biometrics data 116, such as a fingerprint, or any other virtual or physical "ticket," as is also described in more detail below in connection with FIG. 2. In order to communicate with and/or control the resources 120 and users 110, the controller 102 includes a processor 140, a network interface unit 142, and a memory 150. The processor 140 is configured to execute instructions stored on memory 150 and the network interface unit 142 enables connectivity to the network 104. Generally, the controller 102 may be configured to assign users to work stations within a shared workspace and/or be configured to work in concert with any existing shared workspace management systems that are configured to assign users to work stations within a shared workspace (e.g., the controller 102 may be a subsystem of a shared workspace management system).

The controller 102 also includes various tables and modules that may reside in memory 150. In particular, the controller 102 includes a resource location database 152 that stores information for the locations of any resources and/or users within a workspace and a resource monitoring module 154 that continually tracks the resources 120 in a workspace in order to determine the location of each resource, status information of each resource, and any other desired data related to each of the resources included in the resources 120. The controller 102 may also include a resource assignment module 156 that may determine where resources 120 should be located, sent, moved, etc. based on various inputs, such as the detected presence of a specific user in a specific work station, the identity of a user associated with a specific work station, and/or the status information of a particular resource. However, in some embodiments (e.g., if controller 102 is a subsystem of a shared workspace management system), resource assignment module 156 may simply receive information indicating relationships between users and resources (e.g., from a shared workspace management system). The manner in which the controller 102 controls deployment of the resources 120 is described in more detail below in connection with FIGS. 2-10.

Although each module described herein, such as the resource monitoring module 154 and the resource assignment module 156, is shown as software stored in memory 150, each module described herein may be implemented on hardware, or a combination of hardware and software. For example, each module may include and/or initiate execution of an application specific integrated circuit (ASIC), a Field Programmable Gate Array (FPGA), a circuit, a digital logic circuit, an analog circuit, a combination of discrete circuits, gates, or any other type of hardware, or combination thereof. Accordingly, as used herein, execution of a module by a processor can also refer to logic based-processing by the module that is initiated directly or indirectly by the processor to complete a process or obtain a result. Additionally or alternatively, each module can include memory hardware, such as at least a portion of a memory, for example, that includes instructions executable with a processor to implement one or more of the features of the module. When any one of the modules includes instructions stored in memory and executable with the processor, the module may or may not include a processor. In some examples, each module may include only memory storing instructions executable with the processor to implement the features of the corresponding module without the module including any other hardware.

The memory 150 may also be configured to store data that indicates an association between a particular user and resource, instructions related to charging, updating, or maintaining resources, or any other data. Generally, memory 150 may include read only memory (ROM), random access memory (RAM), magnetic disk storage media devices, optical storage media devices, flash memory devices, electrical, optical or other physical/tangible (e.g., non-transitory) memory storage devices. Thus, in general, the memory 150 may be or include one or more tangible (non-transitory) computer readable storage media (e.g., a memory device) encoded with software comprising computer executable instructions. For example, memory 150 may store instructions that may be executed by processor 140 for controlling resource management in a workspace as described below with reference to FIGS. 2-10. In other words, memory 150 may include instructions, that when executed by one or more processors, cause the one or more processors to carry out the operations described below in connection with FIGS. 2-10.

Still referring to FIG. 1, the plurality of resources 120 may include autonomous, self-propelled resources (e.g., "smart" or active resources) and/or non-autonomous resources with a locator to enable propulsion mechanisms to locate and move the resources (e.g., "dumb" or passive resources). In the embodiment depicted in FIG. 1, Resource 1 and Resource 3 are smart resources and, thus, include a processor 160 configured to execute instructions stored in a memory 164 and a network interface unit 162 that provides connectivity to the network 104. For example, the processor 160 may be configured to execute instructions to control a propulsion unit 166 and/or to communicate a location from a locator 168 to the controller 102. More specifically, in some embodiments, the autonomous physical resources may include at least one motor and wheels, and the processor 160 may be configured to execute instructions stored in memory 164 to drive the motor to roll the physical resource (on its wheels) based on commands received from the controller 102. By comparison, in the example embodiment of FIG. 1, Resource 2 is a dumb resource and, thus, includes a locator 168 to allow the controller 102 to track the location of the particular resource.

If a resource only includes a locator 168 (e.g., if a resource is "dumb"), the controller 102 may utilize a propulsion mechanism 130 to move that particular resource. In the depicted embodiment, the propulsion mechanism 130 includes a processor 170 configured to execute instructions stored in a memory 174 and a network interface unit 172 that provides connectivity to the network 104. The processor 170 may be configured to execute instructions to control a propulsion unit 176 in order to move to and subsequently transport a dumb resource (or a smart resource, if desired) and/or to communicate a location from a locator 178 to the controller 102 (e.g., if the propulsion unit 176 is not currently engaged with a resource and its locator 168). In some embodiments, the propulsion mechanism 130 may be a drone, such as a UAV, a ground-based drone, or a humanoid robot. However, in other embodiments, the propulsion mechanism 130 may include any device or system that can move physical resources to various locations in a workspace. As a non-robotic example, the propulsion mechanism 130 could be a rail system configured to propel physical resources throughout a workspace.

Still referring to FIG. 1, in some embodiments, the environment 100 may also include one or more docks or docking stations, such as dock 180. Each dock 180 includes a processor a processor 182 configured to execute instructions stored in a memory 186 and a network interface unit 184 that provides connectivity to the network 104. The processor 182 may be configured to execute instructions to monitor the status of a physical resource and/or communicate with the controller 102 to relay status information or alerts based on the status information. Moreover, the processor 182 may be configured to execute instructions to utilize input from a sensor 188 to detect the presence of a physical resource. In some embodiments, if a resource is a dumb resource, the controller 102 may track the location of the resource by communicating with a dock, such as dock 180, which detects the presence of the resource via the sensor 188. Additionally or alternatively, the controller 102 may also track the location of a smart physical resource by communicating with a dock 180. The sensor 188 may detect the presence of a physical resource (either smart or dumb) with any sensor technology now know or hereinafter developed, such as pressure sensors and/or proximity sensors.

Figure 2:
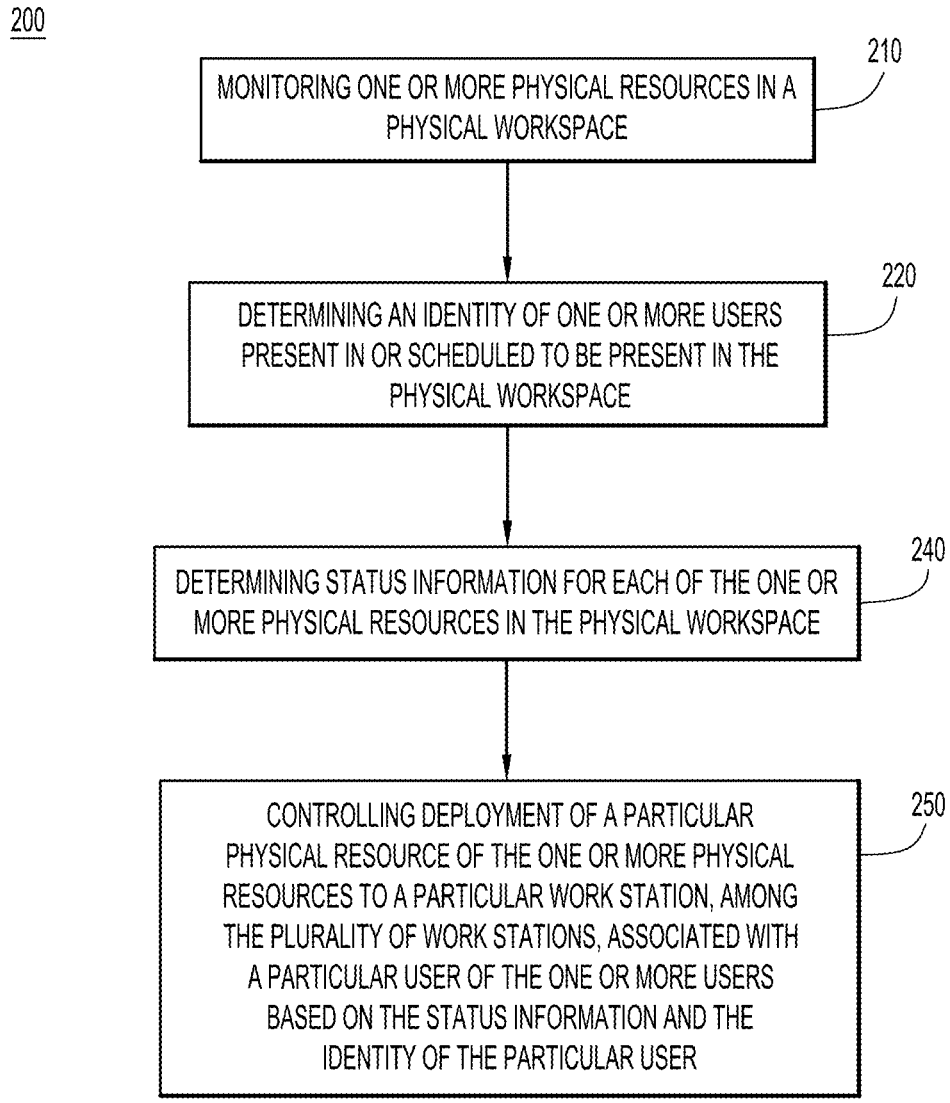
FIG. 2 is a high-level flowchart illustrating a process for controlling resource management in a workspace, according to an example embodiment.

Reference is now made to FIG. 2 (with continued reference to FIG. 1) for a high-level description of a method 200 for controlling resource management in a workspace, such as performed by execution of the software instructions included in the memory 150 of the controller 102. At step 210, one or more physical resources in a physical workspace are monitored by the controller 102. In order to allow the controller 102 to uniquely identify each resource, each of the resources is assigned a unique identification, such as a 128 bit universally unique identifier (UUID). In some embodiments, the controller 102 communicates directly with the physical resources to determine the location of a resource. The controller 102 may also communicate directly with the physical resources to determine additional status information, such as the battery level and operational status. Additionally or alternatively, the controller 102 may communicate with docks 180 or propulsion mechanisms 130 that are interacting with the physical resources in order to monitor the physical resources.

In some embodiments, the physical resources may move between docking stations 180 at work stations (e.g., desk locations) and storage locations, such that each of the physical resources is docked at a docking station unless the physical resource is in transit between docking stations (or if removed by a user during use). Consequently, in at least some embodiments, the controller may monitor the physical resources by monitoring docking stations. However, in other embodiments, the physical resources may simply park in areas of a work station (e.g., a desk location) and storage locations without docks and, thus, the physical resources may be monitored by monitoring (e.g., communicating with) the physical resources themselves. In fact, in some embodiments, at least some of the resources (e.g., the smart resources) may report location, progress, and any other status information to the controller 102 on a continual basis, at predetermined intervals, or at any time.

Regardless of how the physical resources are monitored, the controller may maintain a database (e.g., resource location database 152) while monitoring the resources. The database may track the location of each resource and may also track the locations of different users within the workspace. In some embodiments, the database includes a listing of specific locations in the workspace where the resources may be "parked" and maps each resource to the appropriate specific location based on location data received from the resources, docks, and/or propulsion mechanisms. For example, a shared workspace may include a number of storage locations and desk locations that comprise the specific locations (also referred to herein as "slots") and the physical resources may be mapped to a storage location or desk location based on location data received from the resources, docks, and/or propulsion mechanisms. The desk locations are disposed in or adjacent to a work station, such as an office, cubicle, meeting room, or another office-related space included in the shared workspace while the storage locations may be disposed anywhere in a shared workspace.

More specifically, the storage locations may be disposed in storage rooms, empty offices, or simply a portion of a workspace (e.g., a hallway) and may be used as overflow areas when the desk locations are full. Each of the specific locations (desk locations and storage locations) may include or define a place or area where one or more physical resources can park or dock and each specific location has a unique identification. For example, each specific location may be represented as a 128 bit UUID. The parking slots at or defined by desk locations are accessible by a user in the work station associated with that desk location; however, the storage locations need not include or define parking areas that are accessible. Instead, the physical resources may be stacked, blocked, or otherwise inaccessible when in the storage locations. Consequently, physical resources may not be usable or accessible while in storage (e.g., a file cabinet may not be able to open), but the amount of required storage space may be drastically reduced, as compared to conventional shared workspaces. This may be particularly valuable in oversubscribed spaces where there are more resources than work stations. That being said, in some embodiments, the storage space may not be required to store all of the resources included in that workspace. Instead, desk locations at or in idle work stations, insofar as idle simply signifies that a workspace is not currently in use, may be used together with storage locations to store resources. Thus, in embodiments where every user utilizes at least one resource, a shared workspace may house a number of physical resources equal to the combined number of desk locations and storage locations.

In some embodiments, the specific locations may include a dock (e.g., dock 180) that the physical resource can engage, sit upon, or otherwise be disposed on or adjacent to. At least some of the docks, such as the docks disposed in storage locations, may be charging stations or maintenance bays/stations. However, the term charging is not intended to limit the charging stations to battery charging and may also signify a refueling operation or any other operation which repowers a physical resource or a propulsion mechanism as needed.

The physical resources may be office-based physical resources, such as file cabinets, collaboration systems, whiteboards, printing stations or equipment, displays, and/or audio equipment, etc., though other types of equipment are envisioned. Some of these office-based physical resources may be personal physical resources, insofar as the physical resources belong to one specific user. By comparison, other physical resources may be pooled resources. For example, a file cabinet, or a portion of a file cabinet may be a personal resource for a specific user while a telepresence screen or smart whiteboard may be a pooled resource that is available to any users or a specific subset of users. However, in some embodiments, physical resources may transition between the personal and pooled classifications. For example, if a file cabinet is only be used by a first user during a first week, but then shared by the first user and a second user during a second week (e.g., the first user empties one of two drawers and the empty drawer is assigned to another user), the controller may recognize that the file cabinet has switched from a personal resource to a pooled resource belonging to two specific users. In at least some embodiments, the controller ties the resources to users and/or groups of users and, then, based on the locations of work stations (desk locations) and storage locations, the presence of certain users in the workspace, the needs of certain users, and the status of each of the resources, the controller can send the appropriate resource to each user, as is described below in further detail.

Still referring to FIG. 2, at step 220 the identity of each of the one or more users present in or scheduled to be present in the workspace is determined. In some embodiments, determining the identity of one or more users may involve detecting the presence of the one or more users in the workspace. Generally, a user may be detected and/or identified via any interaction or admission material, whether virtual or physical, ranging from a check-in with a receptionist to automatic detection/identification of a device being carried by a user. For example, in some embodiments, each of the users (e.g., renters) working in the shared workspace, whether regularly or temporarily, is given a specific identification card, key, or device. Then, upon entering (or leaving) the shared workspace (or a specific work station), the identification device may be detected (or no longer detected) in order to detect the presence (or absence) of a user and/or identify that user. Additionally or alternatively, after checking in online, with a receptionist, or in some other manner, a user may be given a "ticket" with a code (e.g., a quick response (QR) code) or work station assignment (e.g., similar to a paper boarding pass), a smartphone "vCard," a passcode, pincode, a secret word, or some other password. The ticket, vCard, passcode/pincode, secret word, or other such password may be used to access or unlock a specific work station or to verify, such as with a receptionist, that the user is assigned a specific work station. However the ticket, vCard, passcode/pincode, secret word, or other such password is used, its use may identify the user and indicate that the user is present in the shared workspace. Still further, a user could be verbally told to go to a certain work station upon identifying themselves to a receptionist or receptionist system (at which point the receptionist or receptionist system would provide an indication of the user's presence and/or identity to the controller 102).

In some embodiments, a user may reserve a specific work station prior to entering the shared workspace (e.g., via an online or telephonic system) and the detection of the user's presence may simply indicate that the user has arrived at their reserved work station (e.g., the user's presence may be detected when he or she uses his or her credentials to access the computer systems). In these embodiments, the user may be provided with a ticket, passcode, etc. that provides an indication of the work station assigned them and/or authentication codes for the computer system included at that work station. Additionally or alternatively, a user may present (e.g., swipe or scan) an identification device at a check-in or welcome desk and may be assigned a work station, such that the controller 102 is informed of a user's identity and knows which specific work station the user will be using. For example, a user could reserve a specific office in advance and then place their fingerprint on a scanner at a welcome desk upon arriving to alert the system of their presence. When a user is assigned a specific work station upon check-in, the specific work station may be assigned based on a predetermined policy, a random choice, or any other technique.

At step 240, status information may be determined for each of the one or more physical resources in the physical workspace. The status information includes data relating to at least the battery level of the resource, the current use state of the resource (e.g., operational status), and/or maintenance related data. Moreover, the status information may also include or indicate specific attributes, such as low battery, maintenance needed, etc. In at least some embodiments, the operational status information may indicate whether a physical resource is idle (not in use), in use by an owner of the physical resource, in use on demand (e.g., a pooled resource being used on request) or any other data relating to the current use state (or lack thereof) of a resource. The use information may also indicate the frequency with which certain resources are being used and/or the last time a physical resource (or portions thereof) was used. This tracking may allow certain physical resources, such as filing cabinets, to be selected for recycling (e.g., emptied out and assigned to a new user).

The battery information may indicate the battery status of a resource, which may include the battery status of the automated systems (e.g., the battery powering internal systems of the physical resource relating to propulsion and communication with the controller) and/or the battery status of the office-based portion of the resource (e.g., the battery status of an electronic whiteboard). Additionally, the battery information may indicate whether a physical resource is charging or charged when a physical resource is disposed in a charging station. Consequently, the controller may know when physical resources can be moved out of a charging station. Finally, maintenance related data may indicate whether a physical resource needs service, perhaps by indicating that an error has been detected. The error may a hardware error, such as a broken wheel, malfunctioning motor, or a cracked display, and/or a software error.

In some embodiments, the physical resources may be continually monitored in order to update the status information of each physical resource. Additionally or alternatively, a physical resource may be monitored when a person associated with or currently using that resource checks out. For example, when a user checks out of a work station of a shared workspace, the work station and resources associated with that user may be determined to be idle and the resources may be checked for the presence of any attributes, such as low battery level or a software error. As is described below in more detail, if the status information provides some attribute indicating an issue, the idled resource may be sent to an appropriate station, such as a charging station, to remedy the issue.

Upon determining the identity of a user present in or scheduled to be present in the workspace and determining the status information of the resources, the controller 102 may, at step 250, deploy the appropriate resources to desk locations associated with a specific work station (e.g., an office, a cubicle, a meeting room, etc.) being used by a particular user. Consequently, if a particular user has physical resources stored in the workspace, the physical resources will be automatically delivered to the user as the user arrives at their work station, prior to the user arriving at their work station (e.g., the resource moves to the work station faster than the user or moves prior to the user arriving, in anticipation of the user's arrival), or shortly thereafter (e.g., the user moves to the work station faster than the resource). Additionally, similar to conventional shared workspaces, the controller 102 may configure a work station according to personal preferences of the identified user, if known (lighting, music, window shades, desk height, HVAC, etc.), such that a work station in a shared workspace is fully configured for a user upon his or her arrival in the work station, or shortly thereafter.

As physical resources are deployed and/or as users enter or exit a workspace, the controller may utilize vectored/scatter-gathered inputs and outputs (I/O) to constantly update and link the locations of physical resources and users. Moreover, in at least some embodiments, a resource will remain parked at a specific location until reassigned, thereby simplifying the deployment process. In some embodiments, if an idle work station has a first resource stored therein, the controller will move the first resource to a different idle location (storage or desk location) when the idle work station is assigned to a user. For example, the first resource may trade or swap locations with a second resource that is associated with the user that is currently checking in, as is described in further detail below in connection with FIGS. 5 and 6.

Generally, each of the physical resources is moved autonomously, insofar as the physical resources are moved without any human intervention. If a physical resource includes a propulsion unit, such as wheels and a motor, the physical resource may move itself. Alternatively, a propulsion mechanism, such as propulsion mechanism 130, may engage and move a physical resource if needed. Regardless of how the physical resource is moved, indoor geolocation systems may be used to locate, map, and guide the physical resources through a shared workspace to the appropriate work station. Additional sensory methods, such as LIDAR and collision sensors, may also be used to move the physical resources on virtual tracks (e.g., radio pathways), on physical paths (e.g., tape on the floor and/or lanes), and/or along free-paths while preventing collisions. Any other safety and anti-accident features may also be incorporated into the physical resources and/or controller to ensure that physical resources are delivered in a safe and secure manner. Additionally, if necessary, a physical resource could communicate with elevators, doors, and other building features via wireless communication methods, such as Bluetooth®, to move between floors or segments of buildings.

When the physical resources move to users, the physical resources move between specific locations in the workspace. More specifically, the physical resources move between desk locations and storage locations. In some embodiments, at least some of the storage locations may be or include charging stations and/or maintenance stations. Consequently, as the physical resources indicate battery or maintenance related issues to the controller, the controller can instruct the physical resources to move to the appropriate service station. If the appropriate station is occupied, the controller may provide instructions as to whether the physical resource should move to another station or queue at that station until the station becomes available. The controller may determine the quickest solution based on the status of the other resources and historical patterns. Additionally or alternatively, service data may be tracked and the physical resources may be sent for service (charging, repairs) at specific locations at predetermined intervals. Still further, in at least some embodiments, the battery and maintenance status of physical resources will be automatically checked when the physical resources are transitioning to an idle use state (e.g., when no longer being used) and, then, the physical resources may be instructed to stop at (or queue at) a charging station or maintenance station if necessary.

In at least some embodiments a shared workspace may be initially configured to offer in-workspace physical storage to every user in the form of a movable storage cabinet (e.g., a self-propelled filing cabinet). In these embodiments, when a user checks into a workspace, the user can choose whether he or she would like storage. If the user is new and elects to have storage, an unused cabinet is assigned to the user and moved to the desk location associated with the work station assigned to the user (from an idle desk location or a storage location). If the user already has an assigned storage cabinet, the controller instructs that cabinet to move or be moved to the work station associated with the user. However, this embodiment is merely an example and, in other embodiments, the same techniques may be used with other physical resources, such as electronic whiteboards or printing stations, if desired.

As a summary of FIG. 2, in at least some embodiments, the method 200 includes, at a controller having connectivity to a network, monitoring one or more physical resources in a physical workspace having a plurality of work stations. An identity of one or more users present in or scheduled to be present in the physical workspace and status information for each of the one or more physical resources in the physical workspace may then be determined. Based on the status information and the identity of the particular user, deployment of a particular physical resource of the one or more physical resources to a particular work station, among the plurality of work stations, associated with a particular user of the one or more users may be controlled.

In some of these embodiments, controlling the deployment further comprises determining specific locations in the physical workspace for each of the one or more physical resources. The specific locations are selected from one or more desk locations disposed at the plurality of work stations and one or more storage locations. In at least some embodiments, the one or more physical resources are autonomous, and controlling deployment further comprises instructing at least one of the one or more physical resources to move to one of the specific locations in the physical workspace. Additionally or alternatively, the one or more physical resources are configured to be automatically moved, and controlling further comprises instructing a propulsion mechanism to move at least one of the one or more physical resources to one of the specific locations in the physical workspace.

Additionally, in some embodiments, the physical workspace is a shared physical workspace and the physical resources are office-based physical resources comprising at least one of: a file cabinet, a collaboration system, a whiteboard, a printing station, a display, and audio equipment. Still further, the method may also include detecting a presence of the particular user of the one or more users in the physical workspace and determining the particular work station to be associated with the particular user. Additionally or alternatively, the method may include receiving a reservation for the particular user to use one of the plurality of work stations; and assigning the particular user to the particular work station.

Reference is now made to FIGS. 3-10 for a description of example deployment scenarios based on a user checking in, a user requesting a pooled resource, and a user leaving when at least one resource requires service. Generally, FIGS. 3, 5, 7, and 9 illustrate example deployments of physical resources in a shared workspace 302 while FIGS. 4, 6, 8, and 10 illustrate example resource location tables tracking the location of the resources within the shared workspace 302. The workspace 302 includes a plurality of desk locations 304 (also referred to as desk slots), depicted as Desk 1-N, and a plurality of storage locations 306 (also referred to as storage slots) depicted as Storage 1-N. As mentioned, the desk locations 304 may be in offices, cubicles, meeting areas, or any other such work station and need not actually be or include desks if desired. Similarly, the storage locations 306 may be any space or area and need not actually be one specific room or area. In shared workspace 302, at least one of the storage locations 306 includes a maintenance station 308 (Storage 1) and at least one of the storage locations 306 includes a charging station 310 (Storage 2). Additionally, the workspace 302 includes a plurality of resources, which are depicted as Resource 1-X. In FIGS. 4 and 6, only the resource location and user location are illustrated as being tracked, but in FIGS. 8 and 10, resource data is also tracked. However, these fields are merely examples and, in other embodiments, any data fields may be tracked or monitored.

Figure 3:
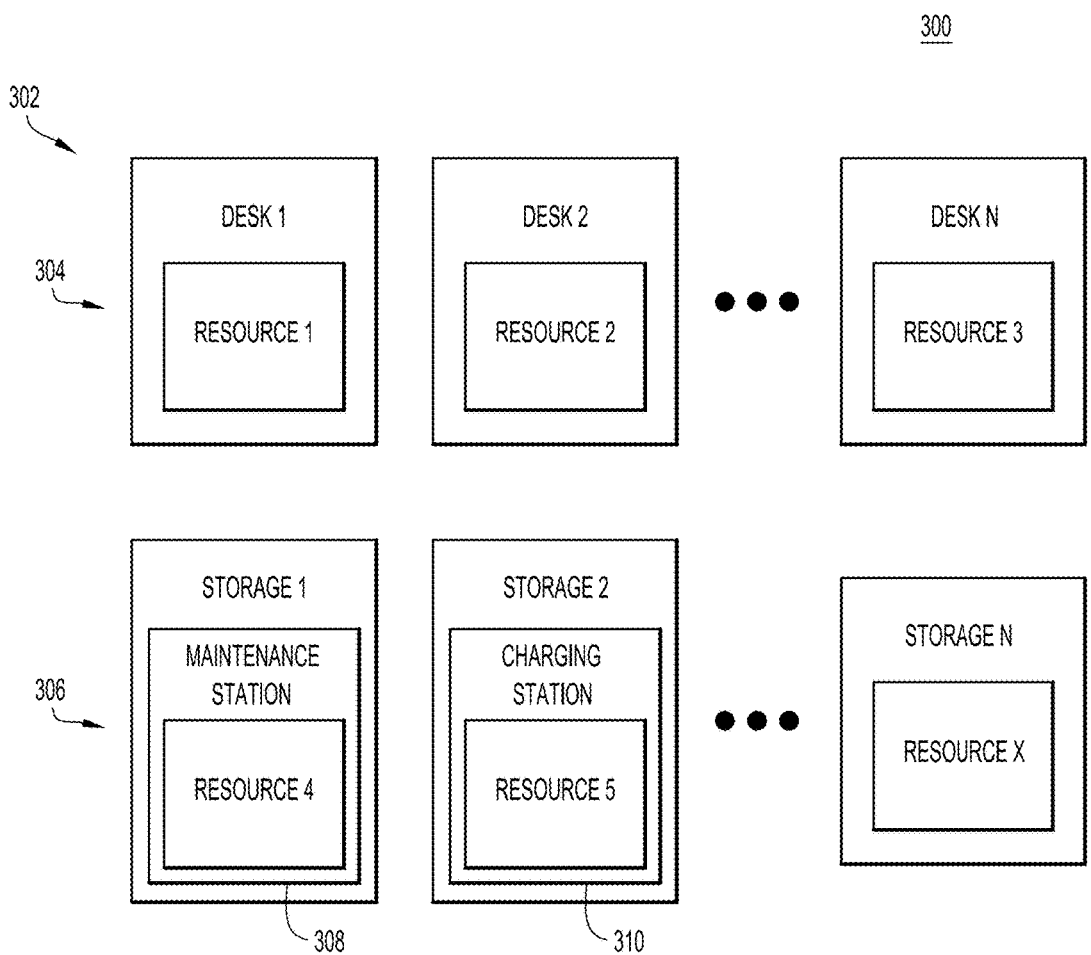
FIG. 3 is a diagram depicting a deployment of resources in a shared workspace, according to an example embodiment.

Initially, in FIGS. 3 and 4, no users are present in the workspace 302. Accordingly, in resource location table 400, the user for each location is shown as "Null." Meanwhile, in deployment diagram 300 the resources are disposed throughout the workspace in any manner. In some embodiments, the resources may remain in their last location until a user arrives in the shared workspace 302. Additionally or alternatively, at least some of the resources may move in order to resolve service-related needs, such as charging or maintenance. In the depicted embodiment, each of the resources is parked at an unused desk location or a storage location. Specifically, Resource 1 is parked at Desk 1, Resource 2 is parked at Desk 2, Resource 3 is parked at Desk N, Resource 4 is parked in the maintenance station 308 of Storage 1, Resource 5 is parked at the charging station 310 of Storage 2, and Resource X is parked at Storage N. As mentioned, in some embodiments, each of the specific locations in workspace 302 (Desk 1-N and Storage 1-N) may include a dock, such that a resource that is parked at a location is disposed in a dock disposed at that location. Additionally or alternatively, at least some of the specific locations in workspace 302 may simply include an area (e.g., a parking space or landing area) where a physical resource may park.

Figure 5:
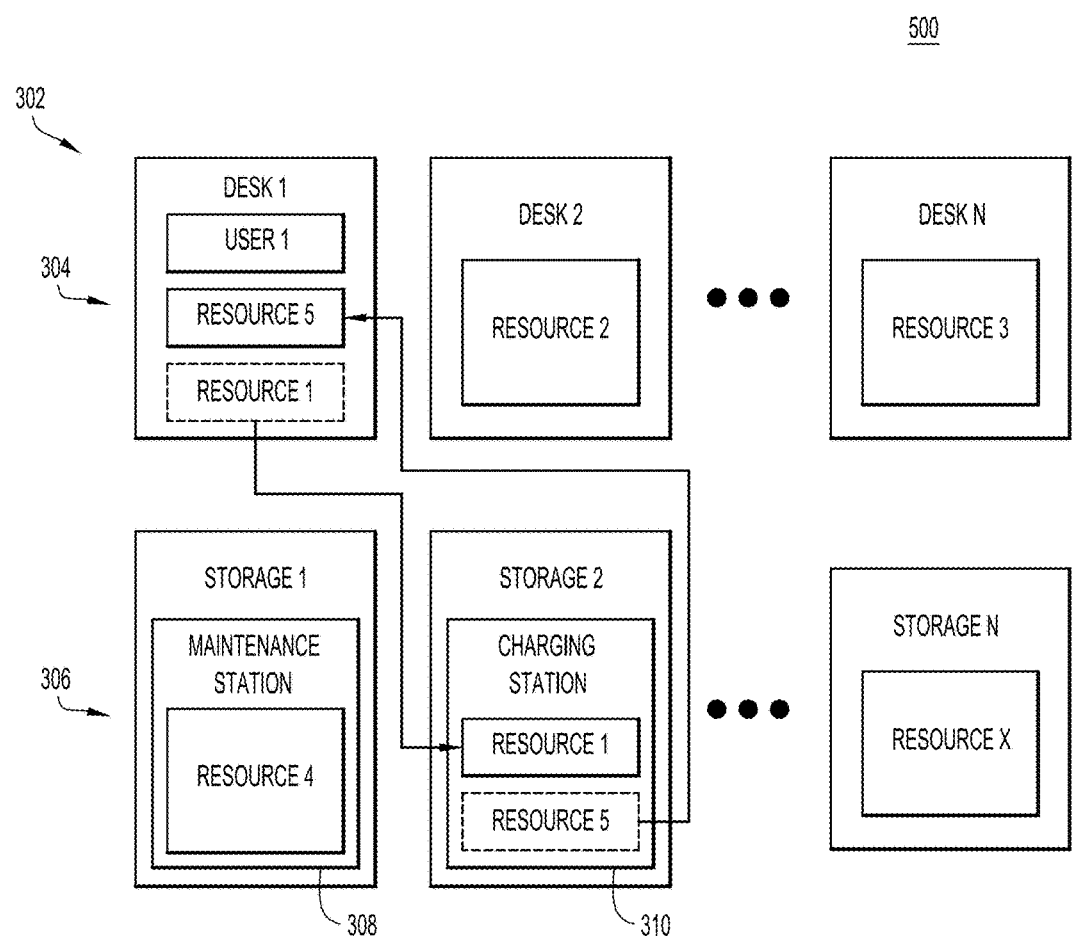
FIG. 5 is a diagram depicting a redeployment of the resources from the deployment of FIG. 3 in response to a user arriving in the shared workspace, according to an example embodiment

Now referring to FIGS. 5 and 6 for a description of deployment diagram 500 and resource location table 600, which illustrate the workspace 302 and the resource location table upon the arrival of User 1. In this scenario, User 1 is associated with Resource 5. For example, Resource 5 may be or include User 1's filing cabinet. Accordingly, when User is identified as being associated with a workstation (e.g., being present or being scheduled to be present at Desk 1), Resource 5 is delivered to the desk location of the work station being used by User 1. In this instance, User 1 checks into the workspace 302 and is assigned Desk 1. Since Resource 1 was initially disposed at Desk 1, the controller instructs Resource 1 to swap places with Resource 5, thereby safely storing Resource 1 while automatically delivering Resource 5 to User 1. After the swap is completed, the resource location table is updated to reflect the swap, as is reflected in table 600. In some embodiments, User 1 may select Desk 1 prior to arriving at the shared workspace 302 and Resource 5 may be moved to Desk 1 prior to User 1's arrival at the workspace 302. For example, upon detecting that Desk 1 is idle (perhaps at the end of the previous work day), the controller may swap Resource 1 (or any other Resource disposed at Desk 1) for Resource 5.

In some embodiments, only a portion of a resource may actually belong to a user. In these embodiments, any security measures may be used to ensure that only the proper user can access his or her portion of the resource. For example, if Resource 5 is a three-drawer filing cabinet and only one drawer of the filing cabinet belongs to User 1, Resource 5 may lock the other two drawers. In some embodiments, each drawer may be locked and a User may be required to unlock his or her cabinet with a key. Additionally or alternatively, portions of a resource may be locked based on geolocation data and user identities. For example, if the controller recognizes that only one of three drawers of Resource 5 is associated with User 1, only that drawer may be unlocked when Resource 5 reaches Desk 1. The remaining two drawers would remain locked until Resource 5 is disposed in a work station associated with the owner of those drawers.

Figure 7:
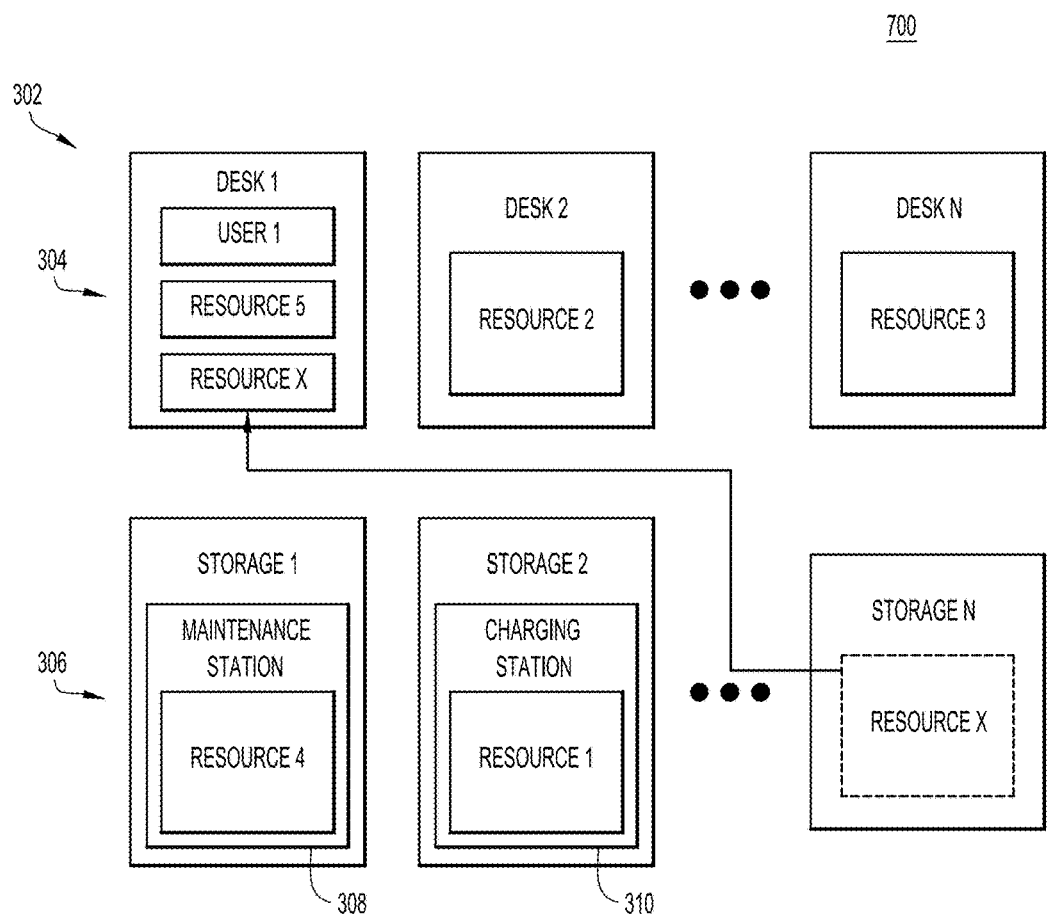
FIG. 7 is a diagram depicting a redeployment of the resources from the deployment of FIG. 5 in response to the user requesting an additional resource, according to an example embodiment

Now referring to FIGS. 7 and 8 for a description of deployment diagram 700 and resource location table 800, which illustrate the workspace 302 and the resource location table upon User 1's request for a pooled resource (Resource X). In this scenario, User 1 has already checked into Desk 1 and been sent Resource 5 (e.g., User 1's filing cabinet), however, User 1 now also needs a pooled resource, such as collaboration equipment or a smart whiteboard, provided by Resource X. When User 1 places a request for Resource X, Resource X is automatically delivered to Desk 1, as shown in deployment diagram 700, and the resource location table is updated accordingly, as is reflected in table 800. In the depicted example, desk location Desk 1 has enough space to receive both Resource 5 and Resource X and, thus, both resources are simply sent to desk location Desk 1. However, in other embodiments, a desk location may not be able to accommodate two resources. In these scenarios, the user and both resources may be moved (or instructed to move) to another desk location with more space, such as a conference room or meeting area. Alternatively, the pooled resource (Resource X) could be swapped for a User's personal resource (Resource 5), if the user indicates that this is acceptable.

In table 800, status information for each of the resources is shown in a column labeled "Resource Data." As discussed above, the status information may include data relating to the battery level of the resource, the current use state of the resource, and/or maintenance related data. In the particular example depicted in FIG. 8, Resource 5 is shown as being in use by its owner and as having full battery and Resource X is shown as currently being used on demand, but as having a low battery. By comparison the remaining resources have a current use state of "idle" and various states of full battery. In particular, Resource 1 has a status of "Charge Complete" while Resource 2, Resource 3, and Resource 4 have a status of "Full Battery." The difference between these battery statuses allows the controller to recognize that Resource 1 is in charging station and, thus, should be moved out of the charging station 310 in favor of a low battery resource once it is fully charged. Still further, Resource 1 also has status information indicating that an error has been detected in Resource 1.

Figure 9:
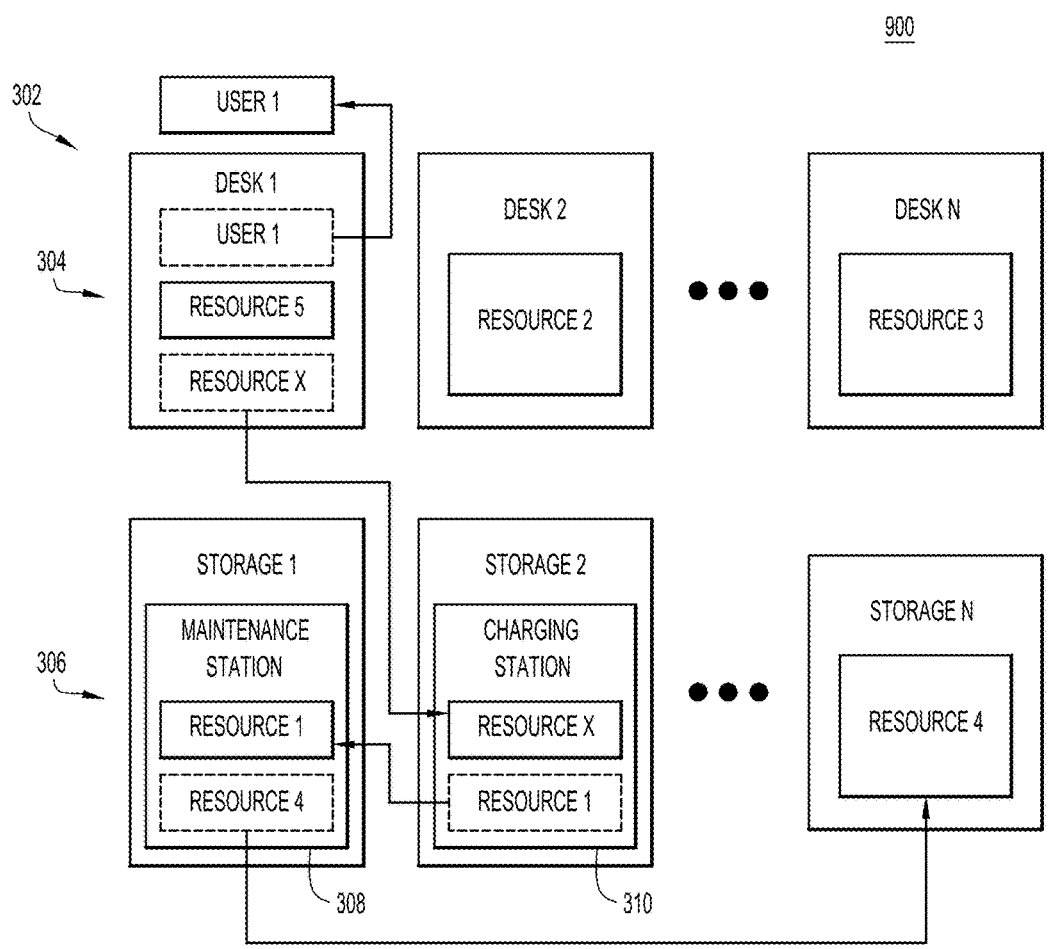
FIG. 9 is a diagram depicting a redeployment of the resources from the deployment of FIG. 7 in response to the user leaving the shared workspace, according to an example embodiment

Now referring to FIGS. 9 and 10 for a description of deployment diagram 900 and resource location table 1000, which illustrate the workspace 302 and the resource location table when User 1 leaves the workspace 302. In deployment diagram 900, three of the resources are moving due to status information of the resources and the detection of a user leaving. As mentioned, in at least some embodiments, when a user checks out (e.g., logs off a computer system), the user field is set to null, the specific location and resources are idled and the status information of the resources that were previously in use is checked for attributes that indicate a need for service. In FIGS. 9 and 10, the resource movement provides service for the attributes that were indicated in FIG. 8, such as "low battery" and "error detected." In particular, since Resource X is indicating a low battery, Resource X is moved to the charging station 310 at Storage 2. In order to make room for Resource X, Resource 1 (which has a full battery) is moved out of Storage 2. If, instead, Resource 1 was not yet fully charged, Resource X could queue up at Storage 2 and wait for Resource 1 to be fully charged. Alternatively, if Storage 2 has space for two resources to charge, or if another storage location has an open charging station, Resource 1 and Resource X could charge simultaneously.

In the depicted embodiment, Resource 1 is indicating that an error is detected and, thus, Resource 1 is moved to the maintenance station 308 in Storage 1 (as opposed to being simply swapped with Resource X). In order to clear room in maintenance station 308, Resource 4 is moved to storage N, which was previously empty. However, similar to the charging scenarios, if Resource 4 was being repaired, Resource 1 could queue up at Storage 1 or be repaired at any open maintenance station in workspace 302.

There are several advantages to the techniques presented herein. As one example, the techniques presented herein track physical resources in a workspace, which allows physical resources to be easily located, serviced, and otherwise maintained. Moreover, automatic delivery of physical resources saves time and resources for both organizations and employees by reducing or eliminating the need for an employee to leave their work station to look for a physical resource. The techniques provided herein may also allow employees using shared workspaces to easily find storage for any physical items, such as files. Still further, the techniques presented herein may allow smart buildings or workspaces to further increase their intelligence and/or management, thereby reducing the resources (e.g., personnel) required to maintain a smart space, whether the space is a shared workspace, an entire building, a factory, a supply chain, or another such space.

To summarize, in one form, a method is provided comprising: at a controller having connectivity to a network, monitoring one or more physical resources in a physical workspace having a plurality of work stations; determining an identity of one or more users present in or scheduled to be present in the physical workspace; determining status information for each of the one or more physical resources in the physical workspace; and controlling deployment of a particular physical resource of the one or more physical resources to a particular work station, among the plurality of work stations, associated with a particular user of the one or more users based on the status information and the identity of the particular user.

In another form, an apparatus is provided comprising: a network interface unit configured to enable network connectivity; and a processor coupled to the network interface unit and configured to: monitor one more physical resources in a workspace having a plurality of work stations; determine an identity of one or more users present in or scheduled to be present in the workspace; determine status information for each of the one or more resources in the workspace; and control deployment of a particular resource of the one or more physical resources to a particular work station, among the plurality of work stations, associated with a particular user of the one or more users based on the status information and the identity of the particular user.

In yet another form, a non-transitory computer-readable storage media is provided encoded with software comprising computer executable instructions and when the software is executed operable to: monitor one more physical resources in a workspace having a plurality of work stations; determine an identity of one or more users present in or scheduled to be present in the workspace; determine status information for each of the one or more resources in the workspace; and control deployment of a particular resource of the one or more physical resources to a particular work station, among the plurality of work stations, associated with a particular user of the one or more users based on the status information and the identity of the particular user.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at a controller having connectivity to a network, monitoring one or more office-based physical resources in a physical workspace having a plurality of work stations;
    determining an identity of one or more users present in or scheduled to be present in the physical workspace;
    determining status information for each of the one or more office-based physical resources in the physical workspace, the status information including categorization information and use information;
    detecting a presence of a particular user of the one or more users in the physical workspace;
    determining a particular physical resource, among the one or more office-based physical resources, to deploy to the particular user based on the use information and the identity of the particular user;
    when the categorization information indicates that the particular physical resource is currently categorized as a personal resource, automatically deploying, with a propulsion mechanism, the particular physical resource to a particular work station, among the plurality of work stations, associated with the particular user and unlocking at least a portion of the particular physical resource for use by the particular user based on the identity of the user; and
    when the categorization information indicates that the particular physical resource is currently categorized as a pooled resource, automatically deploying, with the propulsion mechanism, the particular physical resource to either the particular workstation or a larger workstation based on a size of the particular physical resource and a size of the particular workstation, wherein the particular user is instructed to move to the larger workstation if the particular physical resource is deployed to the larger workstation.

2. The method of claim 1, wherein the automatically deploying further comprises:
    determining specific locations in the physical workspace for each of the one or more office-based physical resources, wherein the specific locations are selected from one or more desk locations disposed at the plurality of work stations and one or more storage locations.

3. The method of claim 2, wherein the propulsion mechanism is included in the particular physical resource so that the particular physical resource is autonomous, and the automatically deploying further comprises:
    causing the particular physical resource to move to one of the specific locations in the physical workspace.

4. The method of claim 2, wherein the particular physical resource is configured to be automatically moved, and the automatically deploying further comprises:
    causing the propulsion mechanism to move the particular physical resource to one of the specific locations in the physical workspace.

5. The method of claim 1, wherein the physical workspace is a shared physical workspace and the office-based physical resources comprise at least one of: a file cabinet, a collaboration system, a whiteboard, a printing station, a display, and audio equipment.

6. The method of claim 1, further comprising:
    determining, prior to an automatic deployment, the particular work station to be associated with the particular user.

7. The method of claim 1, further comprising:
    receiving a reservation for the particular user to use one of the plurality of work stations; and
    assigning, prior to an automatic deployment, the particular user to the particular work station.

8. An apparatus comprising:
    a network interface unit configured to enable network connectivity; and
    a processor coupled to the network interface unit and configured to:
        monitor one or more office-based physical resources in a physical workspace having a plurality of work stations;
        determine an identity of one or more users present in or scheduled to be present in the physical workspace;
        determine status information for each of the one or more office-based physical resources in the physical workspace, the status information including categorization information and use information;
        detect a presence of a particular user of the one or more users in the physical workspace;
        determine a particular physical resource, among the one or more office-based physical resources, to deploy to the particular user based on the use information and the identity of the particular user;
        when the categorization information indicates that the particular physical resource is currently categorized as a personal resource, automatically deploy, with a propulsion mechanism, the particular physical resource to a particular work station, among the plurality of work stations, associated with the particular user and unlock at least a portion of the particular physical resource for use by the particular user based on the identity of the user; and
        when the categorization information indicates that the particular physical resource is currently categorized as a pooled resource, automatically deploy, with the propulsion mechanism, the particular physical resource to either the particular workstation or a larger workstation based on a size of the particular physical resource and a size of the particular workstation, wherein the particular user is instructed to move to the larger workstation if the particular physical resource is deployed to the larger workstation.

9. The apparatus of claim 8, wherein, to automatically deploy, the processor is further configured to:
    determine specific locations in the physical workspace for each of the one or more office-based physical resources, wherein the specific locations are selected from one or more desk locations disposed at the plurality of work stations and one or more storage locations.

10. The apparatus of claim 9, wherein, wherein the propulsion mechanism is included in the particular physical resource so that the particular physical resource is autonomous and, to automatically deploy, the processor is further configured to:
cause the particular physical resource to move to one of the specific locations in the physical workspace.

11. The apparatus of claim 9, wherein the particular physical resource is configured to be automatically moved and, to automatically deploy, the processor is further configured to:
cause the propulsion mechanism to move the particular physical resource to one of the specific locations in the physical workspace.

12. The apparatus of claim 8, wherein the physical workspace is a shared physical workspace and the office-based physical resources comprise at least one of: a file cabinet, a collaboration system, a whiteboard, a printing station, a display, and audio equipment.

13. The apparatus of claim 8, wherein the processor is further configured to:
determine, prior to an automatic deployment, the particular work station to be associated with the particular user.

14. The apparatus of claim 8, wherein the processor is further configured to:
receive a reservation for the particular user to use one of the plurality of work stations; and
assign, prior to an automatic deployment, the particular user to the particular work station.

15. A non-transitory computer-readable storage media encoded with software comprising computer executable instructions and when the software is executed operable to:
monitor one more office-based physical resources in a physical workspace having a plurality of work stations;
determine an identity of one or more users present in or scheduled to be present in the physical workspace;
determine status information for each of the one or more office-based physical resources in the physical workspace, the status information including categorization information and use information;
detect a presence of a particular user of the one or more users in the physical workspace;
determine a particular physical resource, among the one or more office-based physical resources, to deploy to the particular user based on the use information and the identity of the particular user;
when the categorization information indicates that the particular physical resource is currently categorized as a personal resource, automatically deploy, with a propulsion mechanism, the particular physical resource to a particular work station, among the plurality of work stations, associated with the particular user and unlock at least a portion of the particular physical resource for use by the particular user based on the identity of the user; and
when the categorization information indicates that the particular physical resource is currently categorized as a pooled resource, automatically deploy, with the propulsion mechanism, the particular physical resource to either the particular workstation or a larger workstation based on a size of the particular physical resource and a size of the particular workstation, wherein the particular user is instructed to move to the larger workstation if the particular physical resource is deployed to the larger workstation.

16. The non-transitory computer-readable storage media of claim 15, wherein the propulsion mechanism is included in the particular physical resource so that the particular physical resource is autonomous and the instructions operable to automatically deploy further comprise instructions operable to:
determine specific locations in the physical workspace for each of the one or more office-based physical resources, wherein the specific locations are selected from one or more desk locations disposed at the plurality of work stations and one or more storage locations; and
cause the particular physical resource to move to one of the specific locations in the physical workspace.

17. The non-transitory computer-readable storage media of claim 15, wherein the particular physical resource is configured to be automatically moved and the instructions operable to automatically deploy further comprise instructions operable to:
determine specific locations in the physical workspace for each of the one or more office-based physical resources, wherein the specific locations are selected from one or more desk locations disposed at the plurality of work stations and one or more storage locations; and
cause the propulsion mechanism to move the particular physical resource to one of the specific locations in the physical workspace.

18. The non-transitory computer-readable storage media of claim 15, wherein the physical workspace is a shared physical workspace and the office-based physical resources comprise at least one of: a file cabinet, a collaboration system, a whiteboard, a printing station, a display, and audio equipment.

19. The non-transitory computer-readable storage media of claim 15, further comprising instructions operable to:
determine, prior to an automatic deployment, the particular work station to be associated with the particular user.

20. The non-transitory computer-readable storage media of claim 15, further comprising instructions operable to:
receive a reservation for the particular user to use one of the plurality of work stations; and
assign, prior to an automatic deployment, the particular user to the particular work station.

* * * * *